Nov. 12, 1957　　　J. W. FORD　　　2,812,793
ELECTRIC NUTCRACKER
Filed July 12, 1956　　　2 Sheets-Sheet 1

John W. Ford
INVENTOR.

BY

Nov. 12, 1957 J. W. FORD 2,812,793
ELECTRIC NUTCRACKER
Filed July 12, 1956 2 Sheets-Sheet 2
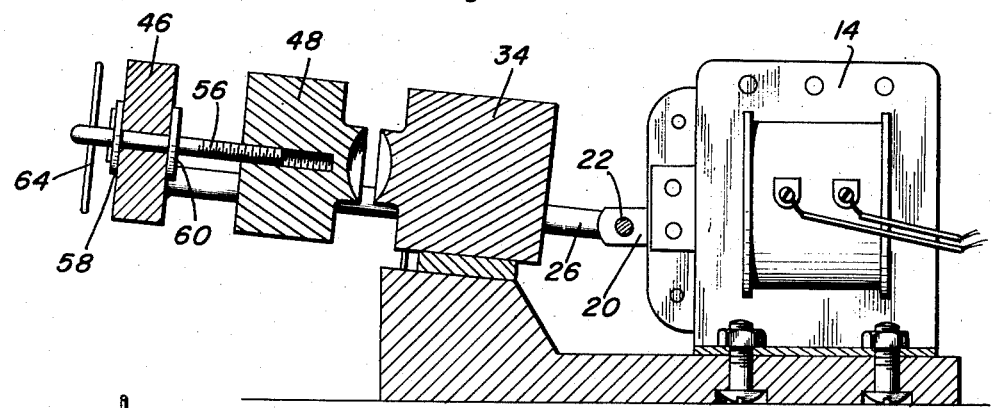
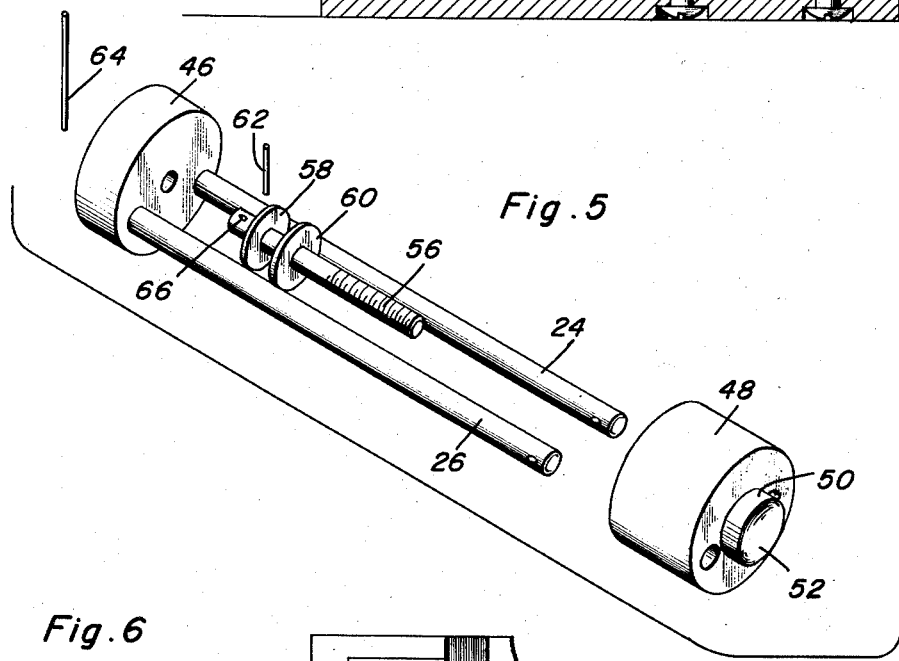
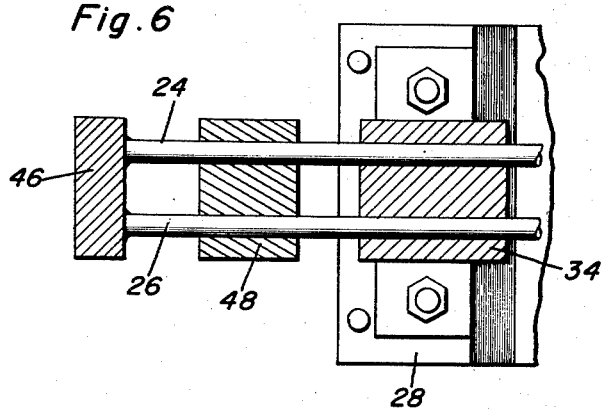
John W. Ford
INVENTOR.

United States Patent Office 2,812,793
Patented Nov. 12, 1957

2,812,793

ELECTRIC NUTCRACKER

John W. Ford, Corsicana, Tex., assignor of one-fourth to Marvin H. Iglehart, Corsicana, Tex.

Application July 12, 1956, Serial No. 597,412

2 Claims. (Cl. 146—12)

This invention relates to an electric nutcracker for shelling various types of nuts such as pecans, walnuts, almonds and Brazil nuts.

The primary object of the present invention resides in the provision of an electric nutcracker which will shell out the meat of the nut generally unbroken.

A further object of the invention resides in the provision of an electric nutcracker which is adapted to be adjusted for various sizes of nuts in a convenient manner and which has means for safeguarding the meat of the nuts whereby the major portion of the nut meat will not be broken or crumbled.

A further object of the invention resides in the provision of a nutcracker having a novel arrangement for seating the nuts in position for cracking.

Still further objects and features of this invention reside in the provision of an electric nutcracker that is simple in construction, easy to utilize and operate, and which is relatively inexpensive to manufacture, thereby permitting wide use and distribution.

These, together with the various ancillary objects and features of the invention which will become apparent as the following description proceeds are attained by this electric nutcracker, a preferred embodiment of which has been illustrated in the accompanying drawings, by way of example only, wherein:

Figure 4 is a sectional detail view similar to that of Figure 2 but showing the position of the movable cracking head after actuation;

Figure 5 is an exploded partial perspective view of the movable cracking assembly; and Figure 6 is a sectional detail view as taken along the plane of line 6—6 in Figure 3 illustrating the mounting arrangements of the movable cracking head.

Figure 1:
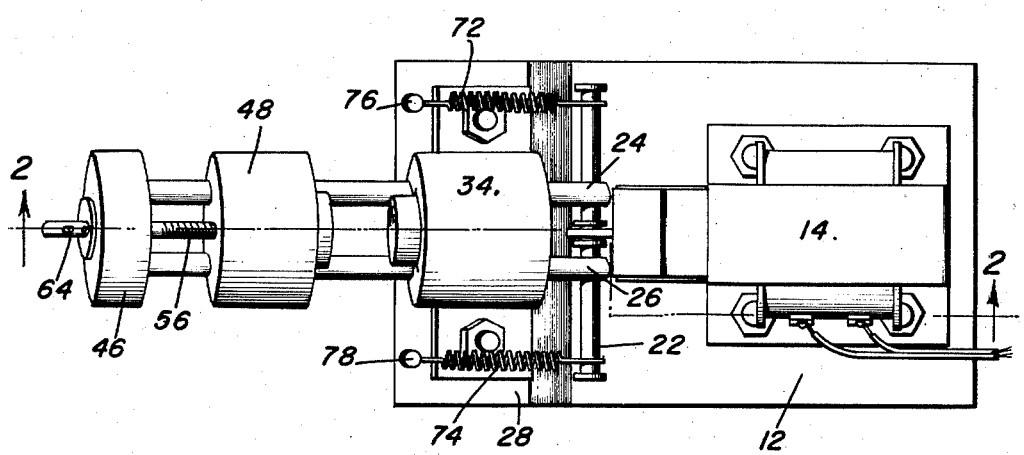
Figure 1 is a plan view of the nutcracker.
Figure 2:
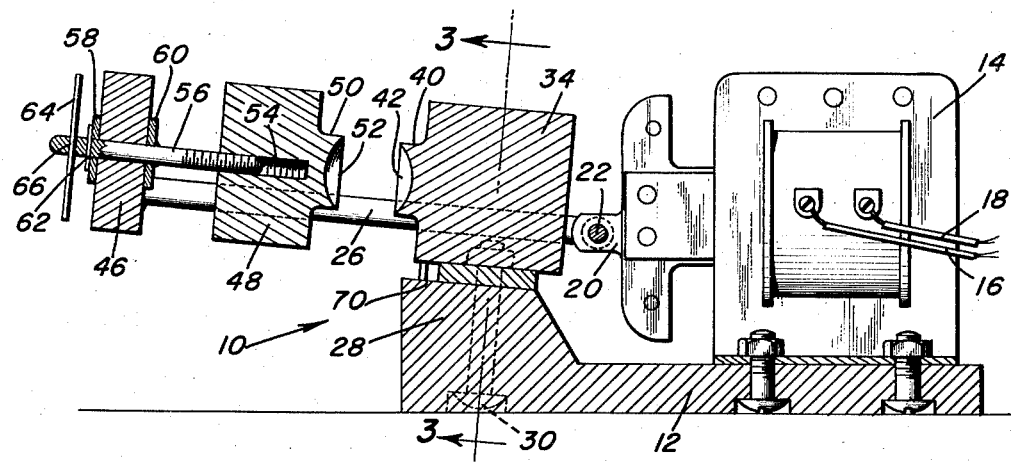
Figure 2 is a sectional view as taken along the planes of line 2—2 in Figure 1 illustrating the construction of the invention with the actuating rods in an extended position.
Figure 3:
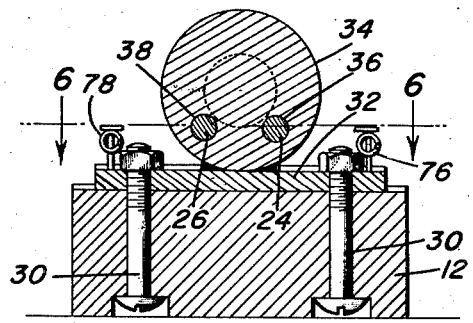
Figure 3 is a sectional detail view as taken along the plane of line 3—3 in Figure 2 illustrating details of construction of the fixed cracking head.

With continuing reference to the accompanying drawings wherein like reference numerals designate similar parts throughout the various views, reference numeral 10 generally designates the electric nutcracker comprising the present invention. Mounted on a base of wood or other suitable material as indicated at 12 is a solenoid 14 to which suitable conductors as at 16 and 18 are connected for connection of the solenoid to a suitable source of electric power, not shown. The solenoid is adapted to actuate an armature 20 which carries a cross arm 22. The cross arm 22 may be rotatably mounted in the armature 20 and mounted on the cross arm 22, rotatably as may be desired, are a pair of actuating rods 24 and 26.

The base 12 has a stepped portion 28 at one end and mounted thereon and secured in place by bolts 30 is a plate 32 having welded as at 33 or otherwise secured thereto a fixed cracking head 34. The fixed cracking head 34 has two bores 36 and 38 therethrough through which the actuating rods 24 and 26 slidably extend. The rods extend through the fixed cracking head 34 adjacent the lower portion thereof and generally below the projecting portion 40 which has a concavity 42 therein.

Secured by any suitable means as by welding as at 45 or the like to the ends of the actuating rods 24 and 26 is a mounting member 46 of a movable cracking assembly. Slidably disposed on the actuating rods 24 and 26 is a movable cracking head 48 having a projection 50 with a concavity 52 therein with the concavity 52 being opposed to the concavity 42.

The movable cracking head 48 is provided with bores therethrough for slidably receiving the actuating rods 24 and 26 and the movable cracking head 48 is provided with a recess 54 which is threaded and which is adapted to threadedly receive an adjusting screw 56 therein. The adjusting screw 56 extends through and is journaled in the mounting member 46 and is held in place by means of collars 58 and 60. The collar 60 may be welded as at 61 to the adjusting screw 56 or otherwise affixed thereto and the collar 58 is held in place by means of a pin 62 or the like. A handle 64 extends through an aperture 66 in the adjusting screw 56 and is affixed thereto in any suitable manner so as to provide means for ready rotation of the adjusting screw 56. In use, the adjusting screw 56 enables the initial position of the movable cracking head 48 to be readily determined merely by rotation of the handle 64 since such will cause the screw 56 to be threaded further into or extracted outwardly from the movable cracking head thus permitting the adjustment of the initial position of the movable cracking head 48.

In use, each actuation of the armature 20 will cause the movable cracking head 48 to be drawn toward the fixed cracking head 34 thus cracking nuts between the projecting portions 50 and 40 with the meat of the nuts being mainly received and protected by the concaved portions 42 and 52. It is noted that the actuation rods 24 and 26 themselves provide an efficient seat for the nuts. Of course, the nuts are held in position against the concaved surface 42 of the fixed cracking head 34 by gravity since the actuating rods 24 and 26 extend angularly upwardly. The base 12 may have the step 28 thereof provided with an inclined surface as at 70 determining the angular relationship of the actuating rods 24 and 26 with respect to the horizontal. After each actuation, in order to return the armature and hence the movable cracking head to its initial position, springs 72 and 74 which are secured to the cross arm 22 are secured to studs 76 and 78 affixed to the base 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A nutcracker comprising a base, a solenoid having an armature actuated thereby, means for exciting said solenoid connected thereto, said solenoid being mounted on said base, a fixed cracking head secured to said base, actuating rods, means pivotally securing the inner ends of said rods to said armature, and a movable cracking assembly carried by said actuating rods oppositely disposed to said fixed cracking head, said movable cracking assembly including a mounting member secured to the outer ends of said actuating rods and movable therewith, a movable cracking head slidably adjustably mounted on said actuating rods, an adjusting screw journaled in said mounting member and adjustably threaded in said movable cracking head for adjusting the initial position of said movable cracking head relative to said fixed cracking head, said actuating rods slidably extending through said fixed cracking head and guided by said fixed cracking head, said actuating rods extending angularly upwardly with said movable cracking head being disposed higher than said fixed cracking head, the portion of said actuating rods between said movable cracking head and said fixed cracking head forming a seat for nuts, said movable cracking head and said fixed cracking head having concave engaging surfaces.

2. The nutcracker of claim 1 wherein said means securing said rods to said armature include a cross arm attached rotatably to said armature and to said actuating rods, said cross arm having ends which protrude laterally from said pair of rods, springs secured to said base and said ends of said cross arm to return said movable cracking assembly to a rest position spaced from said fixed nut cracking head after actuation by said solenoid.

References Cited in the file of this patent

UNITED STATES PATENTS

| | | |
|---|---|---|
| 1,318,182 | Schiemer | Oct. 7, 1919 |
| 1,973,395 | Schreiber | Sept. 11, 1934 |
| 2,707,503 | Johnson et al. | May 3, 1955 |
| 2,740,439 | Dillard | Apr. 3, 1956 |